United States Patent Office 3,453,201
Patented July 1, 1969

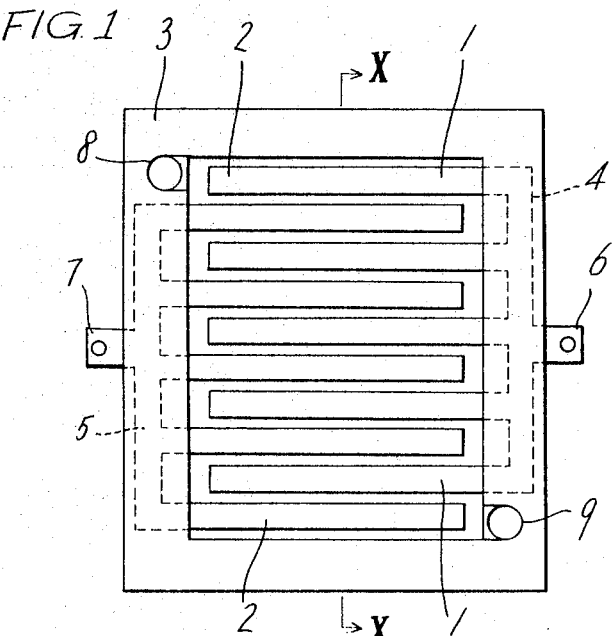
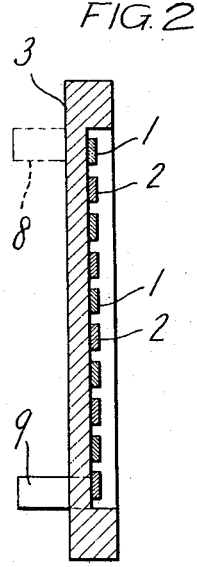
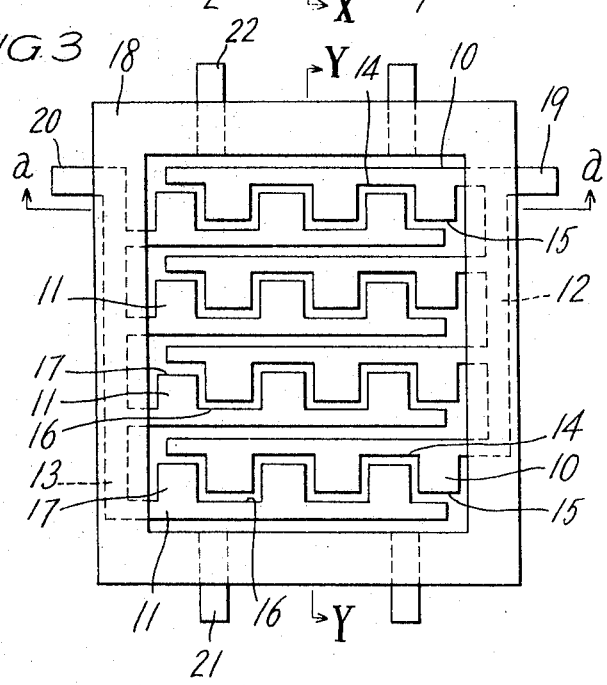
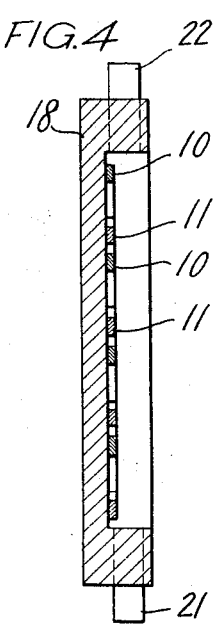

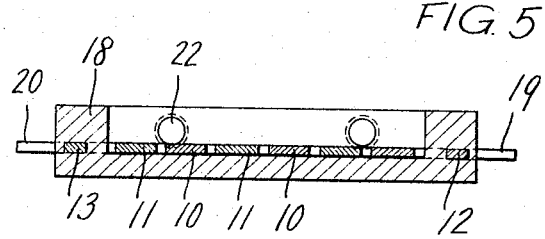
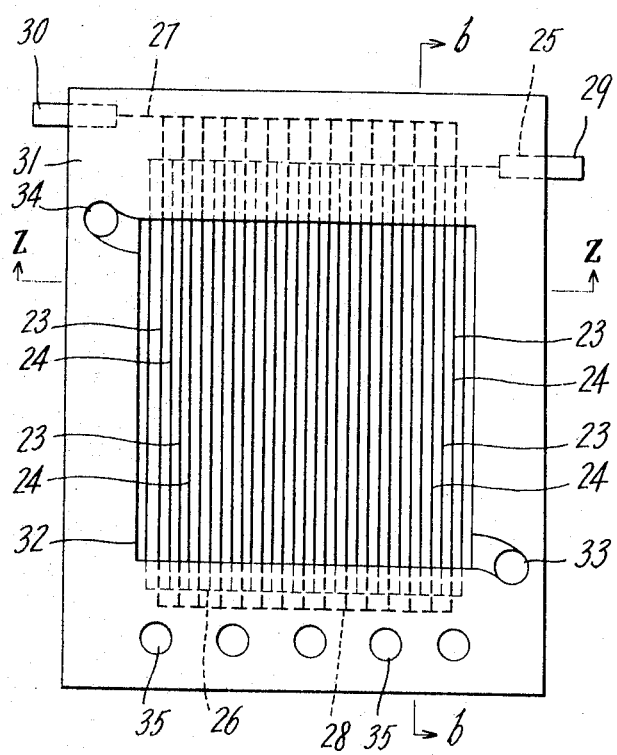
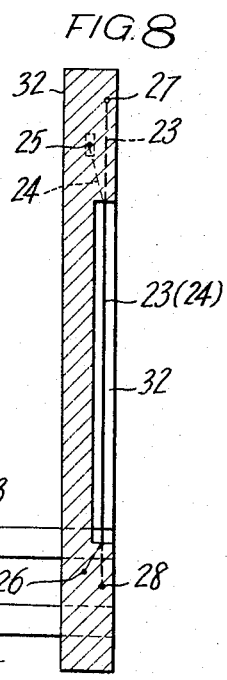
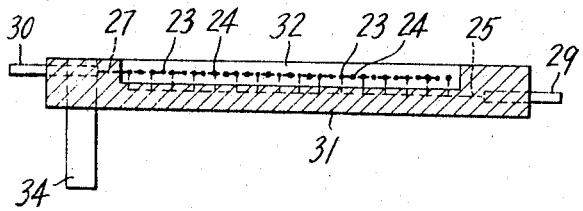

3,453,201
POLARITY REVERSING ELECTRODE UNITS AND ELECTRICAL SWITCHING MEANS THEREFOR
Kazuhiko Mihara, Tokyo, and Masaaki Kato, Yokohama, Japan, assignors to Asahi Kasei Kogyo Kabushiki Kaisha, Kita-ku, Osaka, Japan, a corporation of Japan
Filed Sept. 19, 1966, Ser. No. 580,242
Claims priority, application Japan, Oct. 5, 1965, 40/60,507
Int. Cl. B01k 5/00
U.S. Cl. 204—301        7 Claims

ABSTRACT OF THE DISCLOSURE

A polarity reversing electrode unit having a cathode portion made of titanium or tantalum and an anode portion insulated from said cathode portion and made of material suitable for anodes. Two of such units may be used in an electrolytic cell or the like in such a manner that the cathode portion of one unit is connected to the negative pole of a current supply while the anode portion of the one unit is disconnected from the current supply and the anode portion of the other unit is connected to the positive pole of the current supply while the cathode portion of the other unit is disconnected from the current supply, and vice versa.

---

The present invention relates to electrodes suitable for reversing the polarity in an apparatus for practicing such electrochemical reactions as electrodialysis and electrolytic grease removal.

The present invention contemplates a polarity reversing electrode consisting of an anode structure (hereunder often referred to as "the anode portion" of the electrode) made of an anode material and a cathode structure (hereunder often referred to as "the cathode portion") made of titanium or tantalum, both structures being electrically disconnected from each other and each having a terminal for wiring. The terminal attached to the anode structure or portion is to be connected to electric power so as to allow current to pass through the anode portion when the electrode is used as an anode, while the terminal fixed to the cathode portion is to be connected to power so as to pass current to the cathode portion when the electrode is used as a cathode.

The technique of periodic or nonperiodic reversal of electrode polarity has so far been known in the fields of electrodialysis, electrolytic grease removal and other electrochemical operations. For example, in the process of desalination and concentration of brackish water by electrodialysis using ion-exchange resin membranes, it is known that the technique of polarity reversal and simultaneous interchange of dilution and concentration streams in the electrodialyzer is very effective for the purpose of preventing such unfavourable phenomena as polarization at the surface of ion-exchange resin membrane and scale formation in and/or on the membrane. For the same purpose, the technique of reversing electrode polarity for a short period without interchanging concentration and dilution streams is known also. Furthermore, in the field of electrolytic grease removal there is known the technique of alternating the cathodic and anodic treatments of metal. Among electrochemical fields using electrodes, there are many cases in which the technique of reversing electrode polarity has good effects on the process.

However, the reversion has rarely been practiced in actual apparatus, and even in rare practical cases, the electrodes had a short life span and thus have not been economical. The reason is that no cathode or anode material which can withstand longtime use has been discovered. Generally known to be available as cathode materials are iron, nickel, silver, gold, aluminum, chromium, copper, mercury, lead, titanium, zirconium, tantalum, and such various alloys as stainless steel, aldrey, cadmium copper, silicon copper, brass, duralumin, bronze, ferronickel, Monel metal, nickel silver, and Phosphor bronze. However, all of these cathode materials are rapidly damaged when used as anode. On the other hand, platinum, rhodium, magnetite, etc. are generally known as anode materials. When used as cathode, however, all of these materials have a short life span. Of the anode materials, platinum and rhodium can bear shorttime use when the cycle of polarity reversal is short in time, yet neither of the materials can be used for a long time because of their hydrogen brittleness. Only graphite may be used as an electrode material which makes polarity reversal practicable. However, graphite has the drawback that its surface is gradually eroded. Therefore, in order to be used for a long time, the electrode must be thick or large; accordingly, the apparatus including the electrode must also be large. Hence, it is inconvenient to use the graphite electrode. In addition, the surface erosion causes the operating voltage to increase or the operating current to decrease under a constant electric voltage applied. Moreover, when graphite is used as an electrode, electrode rinse solution is contaminated with carbon powder. This is another trouble connected with the use of a graphite electrode as well as limitation for the shape and structure of graphite electrode. Because of these defects, the application range for graphite electrode is narrow.

The present invention aims at overcoming those defects inherent to the prior electrodes and to provide a suitable electrode for polarity reversal which electrode is almost faultless and can be used economically and in safety for a long period.

The electrode embodying the principle of the present invention comprises a portion made of an anode material and a portion made of a cathode material, both being electrically disconnected from each other. When the electrode thus assembled from the two portions is in use as an anode, electric current is made to pass only the anode material portion; while, when the electrode is used as a cathode, only the cathode material portion is energized. The present inventors have ascertained that the polarity reversal can be carried out smoothly without such defects as described above as long as the electrodes of the present invention are used. The present inventors have sought suitable materials for the two electrode portions by picking up many pairs from a large number of materials. The study has revealed that all of the anode materials stated before can be used as materials for the anode portion. Durability was very good in both cases, when electric current passed the anode portion and when it passed the cathode portion. As for the cathode materials, it has been found that all are durable when electric current is supplied to the cathode portion, that is, when the electrode including the cathode portion is used as a cathode, whereas only titanium and tantalum are good in durability when the anode portion combined with the cathode portion is electrically activated, that is, when the electrode serves as an anode. Both of the abovementioned materials have proved semipermanently usable for many purposes unless chemically eroded by the liquids in which the electrode is immersed. Meanwhile, it has been found that the cathode portion made of any of the other cathode materials such as stainless steel, iron, nickel, silver, and zirconium is beset with erosion and breaking under the influence of double pole formation or anode-generated materials, thus being short in life.

In view of these facts, the present invention has been accomplished.

The present invention will be more fully understood by reference to the accompanying drawings, in which:

FIG. 1 is a plan view showing a polarity reversing electrode embodying the principle of the present invention;

FIG. 2 is a sectional view taken along the line X—X in FIG. 1;

FIG. 3 is a plan view showing another exemplary electrode;

FIG. 4 is a sectional view taken along the line Y—Y in FIG. 3;

FIG. 5 is a sectional view taken along the line a—a in FIG. 3;

FIG. 6 is a plan view showing another electrode embodying the present invention;

FIG. 7 is a sectional view taken along the line Z—Z in FIG. 6;

FIG. 8 is a sectional view taken along the line b—b in FIG. 6; and

Figure 9:
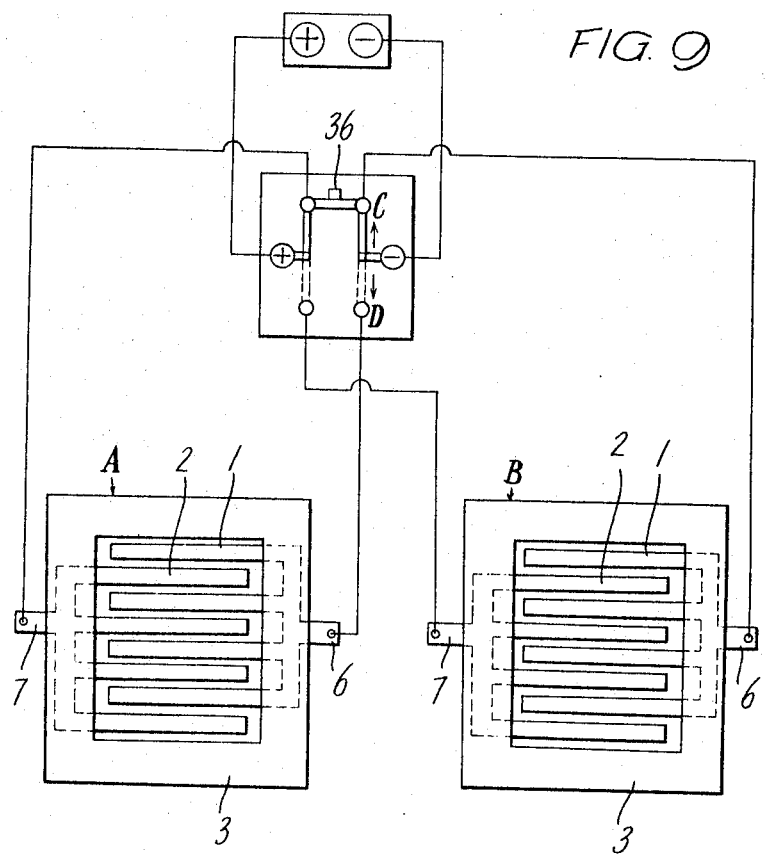
FIG. 9 is a wiring diagram illustrating the principle of a switching mechanism for a pair of electrodes embodying the present invention.

FIG. 1 shows a typical electrode embodying the present invention. A cathode portion 1 through which electric current is passed when the electrode is used as a cathode is made of titanium or tantalum. The portion comprises a group of members in parallel with one another and a support 4 to which the parallel members are connected. The reference numeral 2 denotes an anode portion made of anode material such as, e.g., platinum-plated titanium, through which electricity passes when the electrode serves as an anode. The anode portion 2 comprises a group of members arranged parallel to one another and a support 5 to which the members are connected. Both of the electrode portions 1 and 2 are bolted or fixed in some other way to a nonconductive back plate 3 so as not to be in contact with each other, and have their respective wiring terminals 6 and 7 connected to the supports 4 and 5. Both electrode portions 1 and 2 are preferably so arranged as to cause the least possible inhomogeneity in current density. Although the cathode portion 1 has similar shape to that of anode portion 2 in the figure, both portions may be different in configuration but not electrically connected to each other. Numerals 8 and 9 stand for inlet and outlet of electrode rinse liquid. FIG. 2 is a sectional view taken along the line X—X in FIG. 1.

FIG. 3 shows another embodiment of this invention which is to be used as a polarity reversing electrode for an ion-exchange membrane electrodialysis equipment. The anode portion 10 is made of an anode material so as to comprise a plurality of constituent members having recesses 14 and projections 15 and arranged in parallel and a support 12 connected with the parallel members. On the other hand, the cathode portion 11 is formed of titanium or tantalum so as to comprise a plurality of component members having recessions 16 and projections 17 and arranged in parallel and a support 13 connected with the members. Both electrode portions 10 and 11 are arranged so as to be uniformly spaced from each other and housed in a common electrode frame 18 made of a nonconductive material and have their respective terminals 19 and 20 for wire connection. The electrode frame 18 is equipped with pipes 21 and 22 for the supply and discharge of electrode rinse solution. FIGS. 4 and 5 are sectional views taken along the lines Y—Y and a—a in FIG. 3, respectively.

FIG. 6 illustrates another polarity reversing electrode embodying the present invention. Wires 23 made of an anode material and wires 24 made of titanium or tantalum are alternately arranged in the shape of a blind and connected to electrically conductive materials 25 and 26, 27 and 28, respectively, so that the group of wires 23 is electrically independent of the group of wires 24, and both wire groups have their respective terminals 29 and 30 for external wire connection. The electrode frame 31 has conduit holes 33 for leading electrode rinse solution to an electrode chamber 32 and conduit holes 34 for discharging the solution, as seen at the lower and upper spots of the figure respectively. Openings 35 are for supplying or discharging electrodialysis liquids to or from the dilution compartments and the concentration compartments. FIGS. 7 and 8 are sectional vews taken along the lines Z—Z and b—b in FIG. 6.

Although each of the electrodes shown in FIGS. 1, 3 and 6 has its anode and cathode portions arranged in the same plane, it is to be understood that the present invention includes the construction in which both electrode portions are arranged in different planes.

FIG. 9 illustrates the principle of a switching mechanism for a pair of electrodes A and B embodying the present invention, for example, two electrodes as shown in FIG. 1, which are each composed of the anode portion 2 made of anode material and the cathode portion 1 made of titanium or tantalum and placed in an electrolytic cell, and elecrodialytic cell or any other adequate cell. When a switch 36 is thrown down in the direction C, the terminal 6 of the electrode B is negatively energized and only the cathode portion 1 after electrode B is energized, while the terminal 7 of the electrode A is positively energized and current is supplied only to the anode portion 2 of the electrode A. When the switch is thrown in the direction D, the terminal 7 of the electrode B is positive, while the terminal 6 of the electrode A is negative; thus, polarity reversal is effected.

Here follow two examples of the practice of the present invention.

EXAMPLE 1

A three-chamber cell consisting of two electrode chambers and an intermediate chamber placed between the two chambers and partitioned from each other by means of diaphragms was employed in this example. Polarity reversing electrodes were constructed as shown in FIG. 1 by variously combining the anode materials of platinum-plated titanium and pure platinum with the cathode materials of iron, nickel, titanium, zinconium, tantalum, brass, stainless steel (SUS–32), chromium, and nickel silver. Each of thus assembled electrodes was placed in both electrode chambers. Sea water was fed to both electrode chambers and diluted sea water was made to flow through the intermediate chamber, while electricity was supplied with the inter-electrode voltage maintained at 50 volts and the D.C. current density kept at 30 amp./dm.$^2$. As a result, the above-described anode materials were all found durable in both electrode chambers, that is, when electric current was supplied only to the cathode portions as well as when the anode portions were energized. Meanwhile, all the cathode materials proved durable only when electric current passed the cathode portions; however, when the anode portions were energized, materials other than titanium and tantalum were eroded or broken away within two days so as to be of no further use.

EXAMPLE 2

An electrode formed as shown in FIG. 3 by using a 2 mm. thick titanium plate plated with 5-micron thick platinum as the anode material and a titanium plate 2 mm. thickness as the cathode material and an electrode fabricated as shown in FIG. 3 by using the same anode material and the cathode material of a tantalum plate one mm. in thickness were placed on both sides in an electrodialytic cell. Between both electrodes were alternately arranged 79 sheets of anion-exchange resin membranes and 80 sheets of cation-exchange resin membranes (the effective area for passing electric current being 6.66 dm.$^2$), which were partitioned by means of gaskets and separators so as to form 79 concentration and 79 dilution chambers, and the assembly was tightly pressed between the two electrode compartments. Electrodialysis was carried out by supplying sea water to the dilution chambers at a flow rate of 85 liters per minute and to the concentration chambers at a flow rate of 12 liters per minute and passing a direct current of 35 amperes between the electrodes. Sea water acidified by sulfuric acid to pH of 2.0 was filled in an electrolyte tank having a capacity of 500 liters, and the solution was passed at a rate of 5 liters per minute through the electrode chambers in series and recirculated between the tank and the electrodialyzer. Polarity reversal was carried out in every 24 hours at the same time with the interchange of the concentration and dilution streams.

Such operation was continued for three months under a constant electric voltage of 61 volts between the two electrodes and the electrode rinse solution uncontaminated; thus, the operation could be successfully performed by providing only occasional water addition for preventing the increase in concentration, pH adjustment and dechlorination of the rinse solution.

On the other hand, electrodialysis was carried out under the same conditions as described above except that, instead of the above stated electrodes, conventional graphite plate electrodes 30 mm. in thickness were located on both sides of the stack ion-exchange resin membranes. Then, in three months, the inter-electrode voltage increased from 63 volts to 74 volts and the graphite electrodes decreased in thickness to 15 mm., and the life was estimated to be below half a year. Although the electrode rinse solution was renewed every day, the membranes at the stack ends were remarkably damaged by the breaking-away of carbon from the electrodes and had to be replaced four times during the operation for three months.

What is claimed is:

1. An arrangement of the character described comprising: a pair of spaced, polarity reversing electrode units, each comprising an anode portion made of suitable anode material and a cathode portion separated from said anode portion and made from material selected from the group consisting of titanium and tantalum, each of said portions being provided with a terminal; and switch means for connecting said units to a current supply, said switch means being movable between two positions in one of which the anode portion of one electrode unit is connected to the positive pole of the current supply whereas the cathode portion of said one unit is disconnected from said current supply so that said one unit will act as anode and the cathode portion of the other electrode unit is connected to the negative pole of the current supply and the anode portion of said other unit is disconnected from said current supply so that said other unit will act as cathode, and in the other position of the switch the cathode portion of said one unit is connected to the negative pole of the current supply while the anode portion of said one unit is disconnected from the current supply so that said one unit will act as cathode and the anode portion of the other unit is connected to the positive pole of the current supply while the cathode portion of said other unit is disconnected from said current supply so that said other unit will act as anode.

2. An arrangement as defined in claim 1, wherein said switch means is a two-pole reversing switch.

3. An arrangement as defined in claim 1, wherein each polarity reversing electrode unit includes a support member of insulating material supporting said anode and cathode portions spaced from each other.

4. An arrangement as defined in claim 3, wherein said anode and cathode portions are arranged substantially in a plane.

5. An arrangement as defined in claim 1, wherein said cathode and said anode portion of each unit comprises a plurality of strip shaped substantially parallel members with the strip shaped members of said anode portion alternating with said strip shaped members of said cathode portion, and an elongated support member for each electrode portion integral with said ends of said strip shaped members thereof which face away from the elongated support member of the other electrode portion.

6. An arrangement as defined in claim 5, wherein each of said elongated members has a plurality of cut-outs so as to form a plurality of spaced projections, and the spaced projections of the elongated members formed in said anode portion extending into said cut-outs of the elongated members forming said cathode portion, and vice versa.

7. An arrangement as defined in claim 3, wherein said cathode and said anode portions are respectively formed by a plurality of wires extending substantially parallel to each other and being fixedly connected at opposite ends to said support member, and wire portions interconnecting the opposite ends of the parallel wires respectively forming said anode portion and said cathode portion, said parallel wires forming said anode portion being alternatingly arranged with said parallel wires forming said cathode portion.

References Cited

UNITED STATES PATENTS

| | | | |
|---|---|---|---|
| 767,964 | 8/1904 | Schweitzer | 204—289 X |
| 1,679,449 | 8/1928 | Smith | 313—218 X |
| 2,604,441 | 7/1952 | Cushing | 204—280 X |
| 2,887,614 | 5/1959 | Lafferty | 313—217 X |
| 2,955,999 | 10/1960 | Tirrell | 204—180 |
| 3,055,811 | 9/1962 | Ruff | 204—292 X |
| 3,192,148 | 6/1965 | Kwo-wei Chen | 204—301 |

OTHER REFERENCES

"Industrial and Engineering Chemistry," vol. 49, No. 9, part II, September 1957, article therein entitled "Titanium" by H. B. Bomberger, pertinent pages 1660–1662.

JAMES W. LAWRENCE, *Primary Examiner.*

P. C. DEMEO, *Assistant Examiner.*

U.S. Cl. X.R.

204—228; 313—217